(12) United States Patent
Kossatchev et al.

(10) Patent No.: US 6,698,012 B1
(45) Date of Patent: Feb. 24, 2004

(54) METHOD AND SYSTEM FOR TESTING BEHAVIOR OF PROCEDURES

(75) Inventors: Alexander S. Kossatchev, Moscow (RU); Alexei V. Barancev, Moscow (RU); Igor B. Burdonov, Moscow (RU); Alexander K. Petrenko, Moscow (RU); Dmitri Galter, Nashua, NH (US)

(73) Assignee: Nortel Networks Limited, St. Laurent (CA)

( * ) Notice: Subject to any disclaimer, the term of this patent is extended or adjusted under 35 U.S.C. 154(b) by 547 days.

(21) Appl. No.: 09/663,194

(22) Filed: Sep. 15, 2000

(30) Foreign Application Priority Data

Sep. 17, 1999 (RU) .................. PCT/RU99/00340

(51) Int. Cl.[7] ................................. G06F 9/44
(52) U.S. Cl. ......................... 717/126; 717/124
(58) Field of Search ................ 717/124–127, 717/159–161; 712/227; 714/799–824; 709/102–108

(56) References Cited

U.S. PATENT DOCUMENTS

| | | | |
|---|---|---|---|
| 4,937,765 A | 6/1990 | Shupe et al. ............. 364/570 |
| 5,390,131 A | 2/1995 | Rohrbaugh et al. ........ 364/490 |
| 5,394,347 A | 2/1995 | Kita et al. .............. 364/578 |
| 5,604,895 A | 2/1997 | Raimi .................... 395/500 |
| 5,684,946 A | 11/1997 | Ellis et al. ............ 395/183.09 |
| 5,737,609 A | 4/1998 | Reed et al. ............. 395/704 |
| 5,758,061 A | 5/1998 | Plum .................... 395/183.11 |
| 5,781,720 A | 7/1998 | Parker et al. | |
| 5,805,795 A | 9/1998 | Whitten ................. 395/183.14 |
| 5,860,004 A | 1/1999 | Fowlow et al. ........... 395/701 |
| 5,860,009 A | 1/1999 | Uchihira et al. ......... 395/706 |
| 5,913,023 A | 6/1999 | Szermer ................. 395/704 |
| 5,974,569 A | 10/1999 | Nickles ................. 714/38 |
| 6,038,396 A * | 3/2000 | Iwata et al. ............ 717/161 |
| 6,055,370 A | 4/2000 | Brown et al. ............ 395/705 |
| 6,058,266 A * | 5/2000 | Megiddo et al. .......... 717/156 |
| 6,212,667 B1 | 4/2001 | Geer et al. ............. 716/6 |
| 6,249,526 B1 | 6/2001 | Loukianov .............. 370/442 |
| 6,286,130 B1 * | 9/2001 | Poulsen et al. ......... 717/119 |
| 6,301,688 B1 | 10/2001 | Roy .................... 716/4 |
| 6,401,230 B1 | 6/2002 | Ahanessians et al. ..... 716/1 |
| 6,408,299 B1 | 6/2002 | Weerawarana et al. ..... 707/101 |
| 6,425,118 B1 | 7/2002 | Molloy et al. .......... 717/4 |
| 6,434,500 B1 | 8/2002 | Boehne et al. .......... 702/120 |
| 6,453,292 B2 | 9/2002 | Ramaswamy et al. ....... 704/235 |
| 6,463,582 B1 | 10/2002 | Lethin et al. .......... 717/158 |
| 6,499,114 B1 | 12/2002 | Almstead et al. ........ 714/25 |
| 6,510,402 B1 | 1/2003 | Logan et al. ........... 702/186 |

FOREIGN PATENT DOCUMENTS

| | | | |
|---|---|---|---|
| EP | 0286361 A2 | 10/1988 | |
| EP | 0 406 602 A2 | 9/1991 | .......... G06F/11/00 |
| EP | 0834810 A1 | 4/1998 | |

OTHER PUBLICATIONS

Ferscha et al. N–map: A Virtual Processor Discrete Event Simulation Tool for Performance Prediction in the CAPSE Environment. IEEE. 1995. pp. 276–285.*

Xu et al. Structured Principles for Developing Parallel Computing Programs. IEEE. 1991. pp. 655–660.*

(List continued on next page.)

Primary Examiner—Wei Zhen
(74) Attorney, Agent, or Firm—Withrow & Terranova, PLLC

(57) ABSTRACT

A systematic testing method of procedures is disclosed. The testing is carried out for parallel procedures separately from consecutive procedures which have no parallelism. Behavior of a group of parallel procedures to be tested in a parallel mode is specified. Based on the behavior, the group of procedures is tested using models of correct parallel behavior.

53 Claims, 10 Drawing Sheets

OTHER PUBLICATIONS

Wing, Jeannette and Gong, Chun, "Testing and Verifying Concurrent Objects," Journal of Parallel and Distributed Computing, Academic Press, Duluth, MN, vol. 17, No. 1/2, 1993, pp. 164–182, XP000343153.

"ADL 2.0 Translation System," ADL 2.0 Translation System Design Specification, Verson 1.1, Online!, Aug. 7, 1998, pp. 1–132, XP002215027, http://adl.opengroup.org/documents/ADL2Ds.pdf.

"Formal Derivation of Finite State Machines for Class Testing," *Lecture Notes in Computer Science*, Sep. 1998, V. 1493, pp 42–59.

"Measurement and Verification Approaches for AI Systems," http://kel3.eecs.uic.edu/USAF/appr/docappr.html, Mar. 19, 1999.

"Algebra of Normal Forms," *Summary, Journal of Formalized Mathematics*, Vol 2, October 5, 1990.

"Disjunctive Constraint," http://www.ifcomputer.de/manuals/cons/node56.html.

* cited by examiner

METHOD AND SYSTEM FOR TESTING BEHAVIOR OF PROCEDURES

This invention relates to a method and system for testing behaviour of procedures, and more particularly to a method and system for separate testing of the parallel and isolated behaviour of procedures.

BACKGROUND OF THE INVENTION

Many software systems are developed for parallel execution of sever applications. Each software system contains a functionally closed set of procedures. In order to ensure correct implementation of the software system, it is desirable to determine a software contract, i.e., elements and functional specifications of external interfaces of the software system, and carry out conformance testing of the software contract implementation. Since the elements of the software contract are procedures, it is in fact Application Programming Interface (API) testing.

In software systems, some procedures are called sequentially, without parallelism. Some procedures are called from parallel processes.

In order to test the implementation correctness of procedures of software systems, it is desirable to formalize requirements of correct behaviour of procedures during parallel calls.

Currently, the most common method of testing the parallel behaviour of procedures is a parallel call to procedures. During the parallel call, parameters of the call and returned results are recorded in a trace. Then, either manual analysis of a trace is applied, or the special tools for analysis of particular traces are created. Both approaches are very labour-consuming and prone to errors.

In attempting to formalize the requirements of correct parallel behaviour of procedures, various formal languages and calculations, e.g., temporal logic, are applied. However, their common disadvantage is the difficulty of generating the tests from the collected records or traces.

It is therefore desirable to provide a systematic method for testing procedures which enables reliable testing.

SUMMARY OF THE INVENTION

The present invention specifies behaviour of a group of procedures to be tested in a parallel mode separately from consecutive procedures which have no parallelism. The group of procedures is tested based on the specified behaviour, separately from consecutive procedures.

In accordance with an aspect of the present invention, there is provided a method for testing procedures. The method comprises separating parallel procedures from consecutive procedures which have no parallelism; defining a group of parallel procedures to be tested in a parallel mode; specifying behaviour of the group of procedures in the parallel mode; and testing the group of procedures in the parallel mode separately from the consecutive procedures, based on the specified behaviour.

In accordance with another aspect of the present invention, there is provided a test plan design system for planning testing of procedures. The system comprises means for separating parallel procedures from consecutive procedures which have no parallelism; means for defining a group of parallel procedures to be tested in a parallel mode; means for specifying behaviour of the group of procedures in the parallel mode; and a test suite for testing the group of procedures in the parallel mode separately from the consecutive procedures, based on the specified behaviour.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

There are different kinds of API entities, such as procedures, operations, functions, methods in C++ and subroutines in Fortran. In this specification, these terms are considered synonyms and all are called "procedure".

The present invention may be applied to many different types of procedures. A kernel of an Operating System (OS) comprises API. For example, a Support Operating System (SOS) is a real-time OS for a Digital Multiplexing Switch (DMS) for a communication system. SOS comprises a plurality of processes for supporting the operation of DMS. The lowest layer of SOS is SOS kernel. The SOS kernel allocates resources to the processes running under SOS. The SOS kernel also provides communication among these processes. The SOS kernel also creates, controls and removes these processes. SOS supports more than 25 million lines of code for applications and utilities. Thus, it is critical that user procedure interfaces of the SOS kernel be stable and reliable for correct performances of the DMS switch. The SOS kernel consists of over 1,700 procedures or over 230,000 lines of source code. Thus, it is very complicated and time consuming processes to generate a system for verifying such complex procedure interfaces.

The invention is hereinafter described using a verification system for the SOS, but is not limited to such an application.

Figure 1:
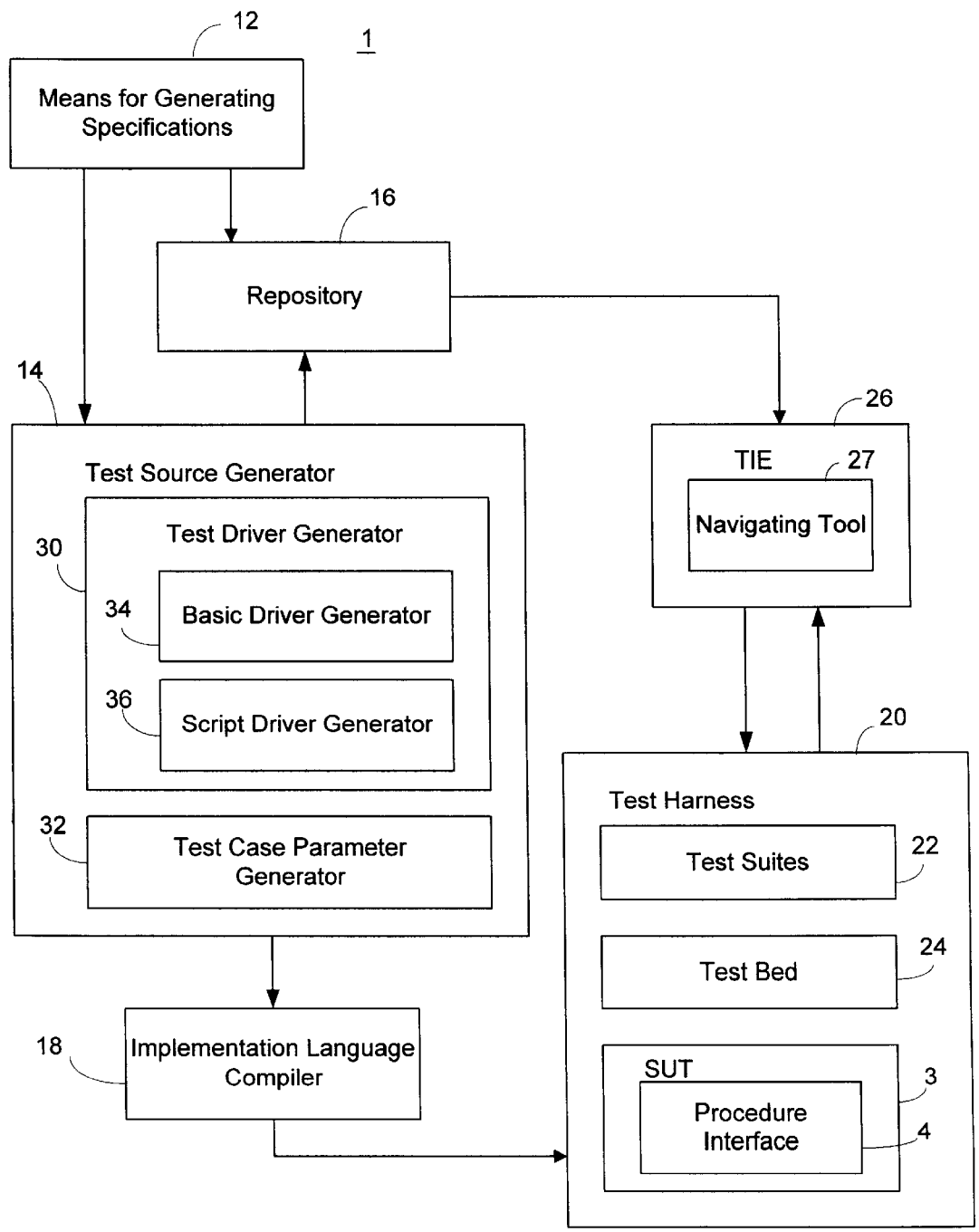
FIG. 1 is a diagram showing an example of a verification system generator to which the present invention is suitably applied.

FIG. 1 shows an example of a verification system generator 1 to which a method for testing procedures in accordance with the present invention is suitably applied. The verification system 2 is generated for verifying a procedure interface 4 of a System Under Test (SUT) 3.

Figure 2:
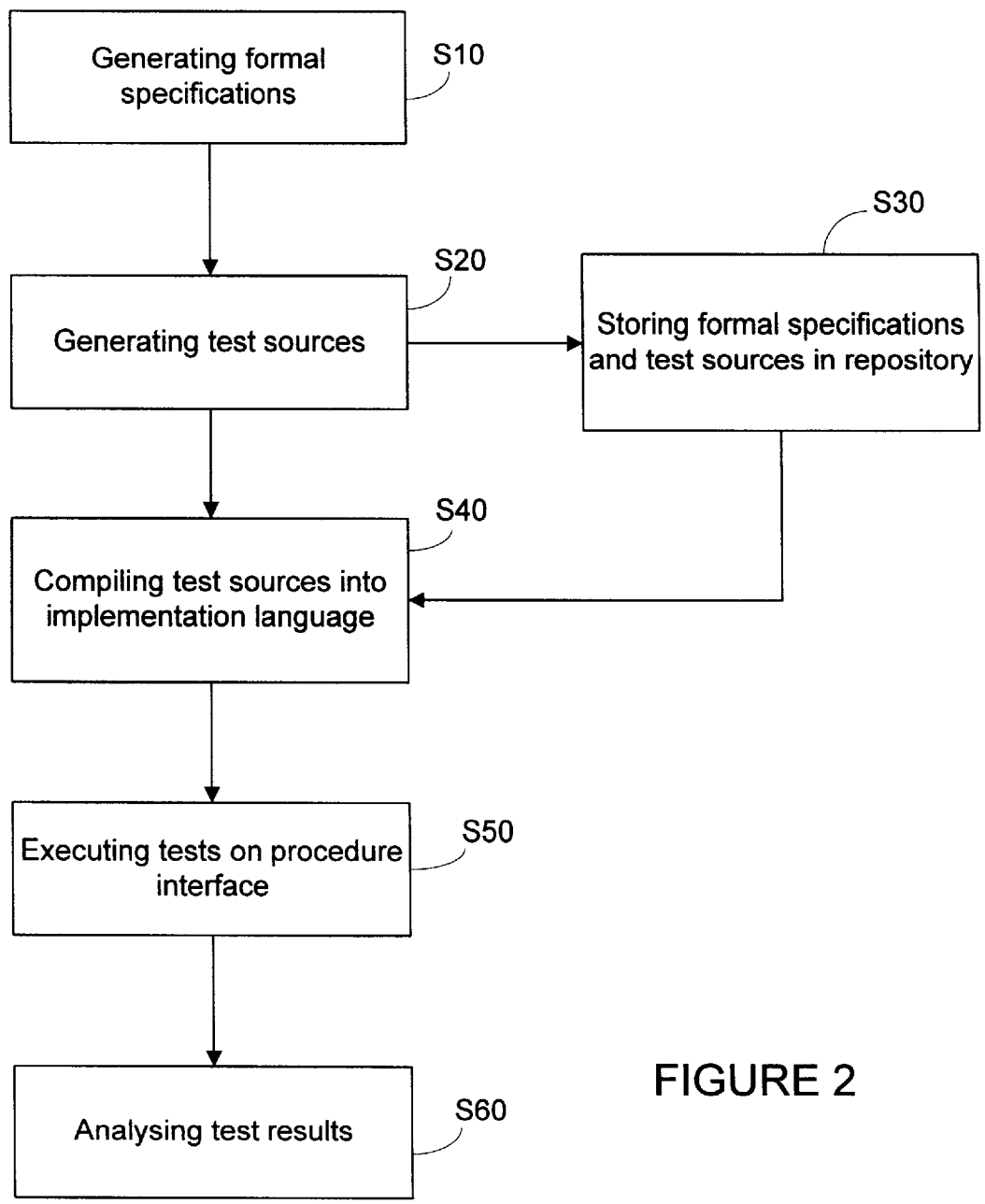
FIG. 2 is a flowchart showing an example of a method for generating a verification system.

The verification system generator 1 comprises means 12 for generating formal specifications, a test source generator 14 and a repository 16. As shown in FIG. 2, the means 12 for generating formal specifications generates formal specifications of the procedure interface 4 (S10). Based on the formal specifications, the test source generator 14 generates test sources (S20). The generated formal specifications and the test sources are stored in the repository 16 (S30).

The test sources are used to generate a test suite 22. The test suite 22 is a set of programs and test data intended for the use in verifying the target procedure interface 4.

The formal specifications are generated in a form independent from implementation of the SUT 3. That is, the formal specifications do not depend on the implementation language, software or hardware of SUT 3, as further described later. The test sources that are generated based on the implementation independent formal specifications are also implementation independent. Accordingly, the test sources may be used on any implementation of the SUT or modified versions of the SUT.

The SUT 3 uses specific implementation language. The test sources are written in specification language that is independent from the implementation language. Accordingly, in order to execute the test sources on the SUT 3 to verify the procedure interface 4 of the SUT 3, the test sources are translated in language executable on the SUT 3 (S40). The translation is carried out by an implementation language compiler 18. The compiler 18 compiles some executable subsets of test sources in the specification language into programs in the implementation language of the SUT 3. The complied programs are specifications in implementation language that can be interpreted as description of some algorithms.

Thus, the generation of the verification system 2 is carried out in two stages. First, generation of implementation independent programs is performed. Then, implementation independent programs are compiled into those in implementation language of the SUT 3. Such a two step generation method allows the means 12 for generating specifications and the test source generator 14 of the verification system generator 1 to be implementation-independent tools and, in particular, implementation-language-independent tools.

The complier 18 may be a part of the verification system generator 1 or may be provided separately from the verification system generator 1.

The compiled test sources form the test suite 22. As the test sources are implementation independent, the test suite 22 is also independent from the implementation of the target SUT 3, other than the language used. That is, the test suite 22 does not depend on the implementation software or hardware of SUT 3. By using the test suite 22, a test harness 20 including the test suite 22 and a test bed 24 is formed for verifying the procedure interface 4 of the SUT 3, as further described below.

The test suite 22 executes tests on the SUT 3 (S50) and analyses results of the tests to verify the procedure interface 4 (S60).

The verification system generator 1 "automates" test generation of real software for verifying a procedure interface 4 of an SUT 3. The expression "automation" used herein does not necessarily mean fully automated manipulation that creates ready for use test data, test sequences and other infrastructure for test execution and test result analysis. An "automated" process may include steps of manually writing some components in implementation language. When the total size of such manually developed components is small as a whole, the process may be considered "automated".

It is preferable that the test source generator 14 comprises a test driver generator 30 and a test case parameter generator 32.

The test case parameter generator 32 generates test case parameter sources for generating test case parameters. That is, the test case parameter generator 32 generates constant arrays and programs that generate and select needed test case parameters. The test case parameters are represented by these constant arrays and programs.

Based on the formal specifications, the test driver generator 30 generates test driver sources for generating test drivers. The test drivers execute tests on the SUT 3 using the test case parameters in implementation environments and analysing results of tests.

The test drivers comprise programs to execute and control testing of the procedure interface 4. The test case parameters are parameters of a test case. A test case is an instance of a tested procedure. A test case is defined by a procedure name and its parameters, i.e., test case parameters. Also, state of environment may be a factor of defining a test case. The test drivers use the test case parameters and execute test cases on the SUT 3 to verify the procedure interface 4.

The test driver generator 30 generates the test driver sources which, once compiled into the test drivers by the implementation language compiler 18, fulfil functions to initialize the procedure interface 4, prepare input values, call tested procedures with test case parameters, and receive test procedure results and analysis of the test results. In general case, the test driver sources are complex programs.

It is preferable that the test driver generator 30 generates the test driver sources that, once compiled into the test drivers, do not only pass some previously generated test case parameters to the SUT 3, but also control the state of the SUT 3. If the SUT state violates some conditions of the test, the test drivers do not supply test parameters to the procedure interface 4.

As the formal specifications are implementation independent, the generated test driver sources and test case parameter sources are also implementation independent.

The test driver generator 30 preferably comprises a basic driver generator 34 and a script driver generator 36. The basic driver generator 34 analyses the formal specifications, and generates the basic driver sources comprising programs in implementation-independent language. The basic driver sources are used for generating a basic driver in implementation language. The basic driver is a test driver for a target procedure 4. The basic driver checks whether pre-conditions for the target procedure 4 hold for a given tuple of input parameters, calls the target procedure 4 with the given tuple of input parameter, records corresponding output parameters, and assigns a verdict on the correctness of the target procedure execution results. The basic driver preferably also collects information necessary to estimate test coverage or investigate reasons for a fault, as described below.

The script driver generator 36 generates script driver sources which describe sequences of calls to the basic driver with different test case parameters. The script driver sources are used for generating script drivers in implementation language. A script driver is a test driver for a target procedure or a set of target procedures. A script driver reads test options, generates sets of input parameters based on test options, and calls a basic driver with some set of input parameters. A script driver may also perform extra checking of the correctness of the target procedure execution results and assigns a verdict. A script driver may also check whether the test coverage is complete, and if not, it may continue to generate sets of input parameters and call the basic driver with this tuple.

The present invention may be suitably applied to generation of a verification system for arbitrary procedure interface of arbitrary systems. For example, the present invention is suitably applied to generate a verification system for procedure interfaces of a kernel of a Support Operating System (SOS) for a Digital Multiplexing Switch (DMS). The invention is hereinafter described mainly for verification of SOS kernel interfaces, but it is not limited to this application.

Generating Formal Specifications

Figure 3:
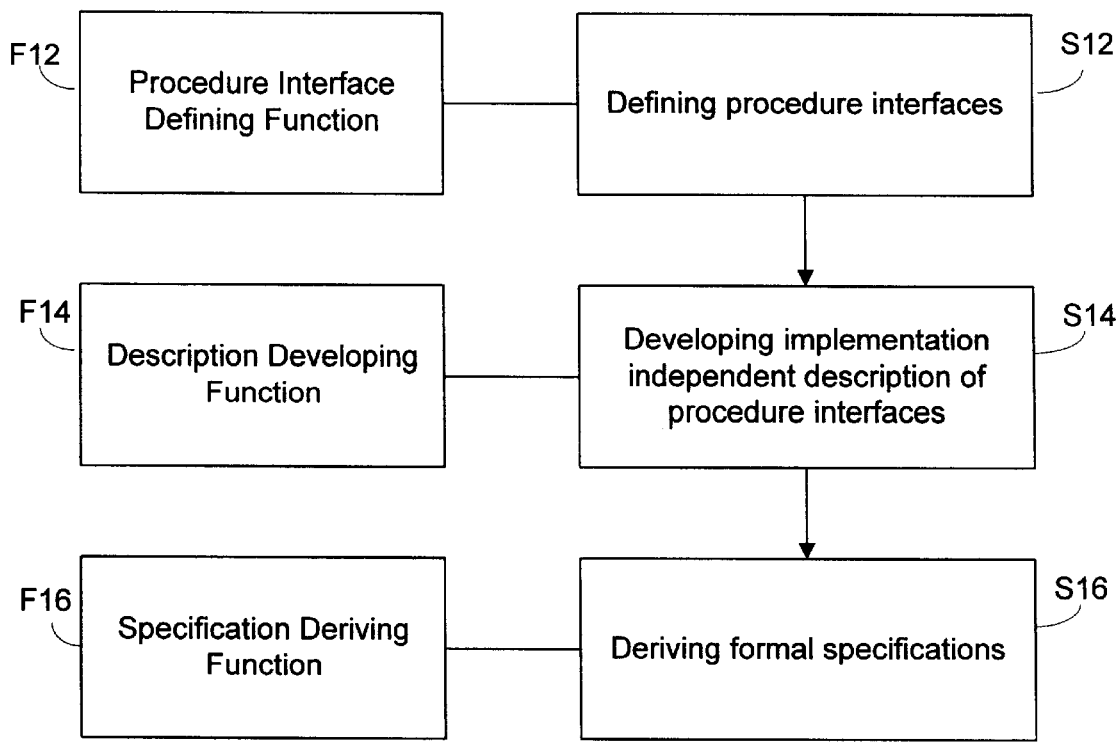
FIG. 3 is a flowchart showing steps of formal specification generation shown in FIG. 2.
Figure 4:
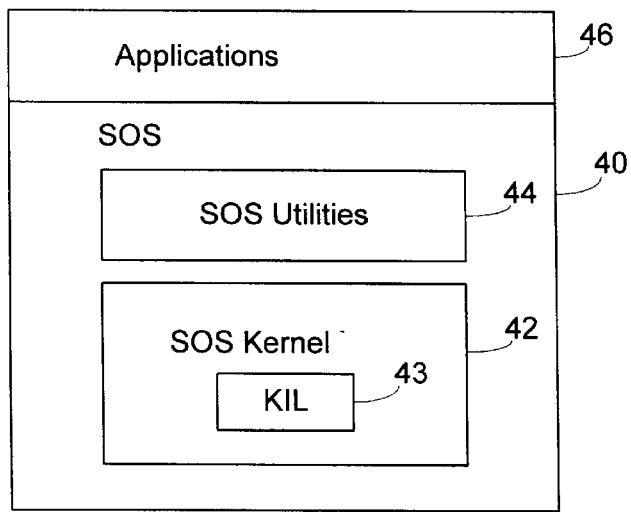
FIG. 4 is a diagram showing a structure of a Support Operation System (SOS)

The generation of the formal specifications of the procedure interfaces is further described referring to FIGS. 3 and 4.

The means 12 for generating specifications first provides a function (F12) for defining procedure interfaces of the SOS kernel (S12).

As shown in FIG. 4, SOS 40 has SOS kernel 42 and SOS utilities 44. SOS 40 supports applications 46. SOS 40 is written using Nortel Networks Corporation's proprietary programming language called Protel, which is an example of the implementation, or target, language.

The SOS Kernel 42 comprises a plurality of procedures. The procedure interface defining function (F12) categorises the procedures of the SOS Kernel 42 into two groups: one group for those depending on implementation of SOS 40, and the other group for those independent from implementation of SOS 40. The procedure interface defining function (F12) then defines procedure interfaces to consist of procedures that are implementation independent. The defined procedure interfaces form a Kernel Interface Layer (KIL). KIL 43 does not depend on implementation and, in particular, on hardware special features of SOS 40. The procedure interfaces of KIL 43 are defined such that each procedure in KIL 43 performs one and only one service. No two procedures provide the same service. Thus, KIL 43 comprises minimal and orthogonal procedures needed by upper layers of SOS 40 and applications 46. KIL 43 hides internal data structures and implementation details of the SOS kernel 42.

Based on the defined procedure interfaces of KIL 43, the means 12 for generating specifications provides a function (F14) for developing implementation independent description of the procedure interfaces of KIL 43 (S14).

The description developing function (F14) rigorously describes functionality of the procedure interfaces of KIL 43.

The implementation independent description may be developed using reverse engineering. The basic idea of the reverse engineering approach is a gradual "upwarding" of data representation in defined implementations. "Upwarding" is increasing the level of abstraction.

Figure 5:
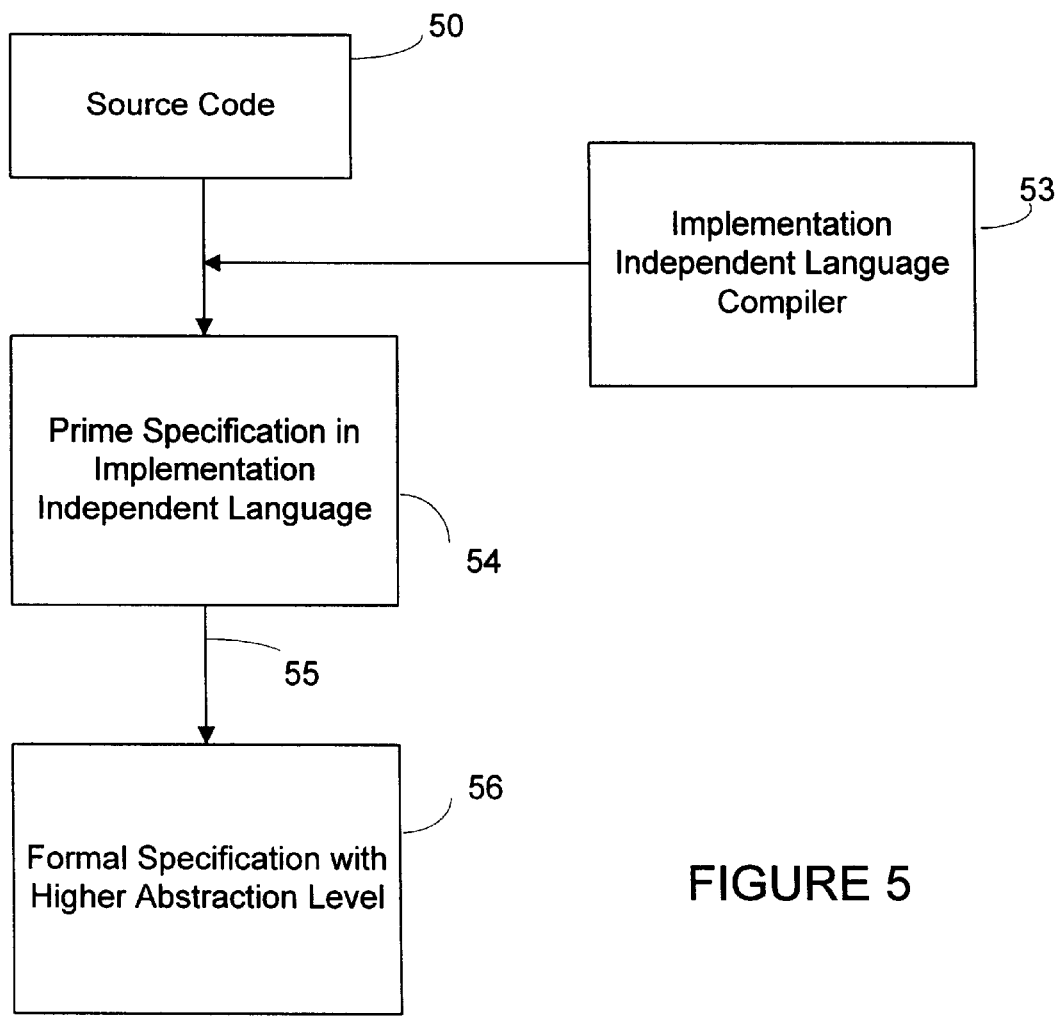
FIG. 5 is a diagram showing an example of formal specification generation.

For example, as shown in FIG. 5, it may be developed using source code 50 of the SOS kernel 42. The source code 50 is in the implementation language of SOS 40. The source code 50 is compiled into implementation independent language to generate a prime specification, i.e., implementation independent description 54. It is preferable to use an implementation independent language compiler 53 to carry out this compiling process automatically.

The implementation independent description may also be developed from documents or other information of the SOS Kernel 42.

As shown in FIG. 3, the means 12 then provides a function (F16) for deriving formal specifications of KIL 43 from the implementation independent description (S16). In the example shown in FIG. 5, the level of abstraction of the prime specification 54 is increased to generate a formal specification 56. This abstraction process 55 may be carried out manually.

It is preferable to use Rigorous Approach to Industrial Software Engineering (RAISE) to generate formal specifications. RAISE Specification Language (RSL) is suitable to write formal specifications. RSL is supported by commercial tools for syntax and semantics checking, such as an EDEN-sintaxicaly oriented editor, a RAISE to ADA compiler, and a RAISE to C++ compiler.

Other RAISE features, e.g., axiom, algebraic specifications and channels may be used in semiformal considerations and explanations.

Also, it is preferable to use model-oriented specification in implicit form as the main form of specification. The implicit form describes a target procedure using pre-conditions and post-conditions of the target procedure.

The means 12 for generating specification may comprise a tool or a set of tools for providing above described functions for aiding a specifier to manually or semi-automatically generates the specifications. An example of such tools is the implementation independent language complier 53 as described above.

It is preferable to classify procedure interfaces of the target SUT by using the specifications. The following classification of procedures of a procedure interface is suitably used for generating a verification system for the procedure interface. The procedure interface classes include five main classes of procedures and some extensions of classes including procedures tested in parallel and expected exceptions. The classes are organized hierarchically. The first class establishes the strongest requirements. Each following class weakens the requirements. The requirements for the five classes are as follows:

KIND_1: The input is data that could be represented in literal (textual) form and can be produced without accounting for any interdependencies between the values of different test case parameters. Such procedures can be tested separately because no other target procedure is needed to generate input test case parameters and analyse the outcome of the tests.

KIND_2: No interdependencies exist between the input items, i.e., values of input test case parameters. The input does not have to be in literal form. Such procedures can be tested separately. Examples of this class include procedures with pointer type input parameters.

KIND_3: Some interdependencies exist, however, separate testing is possible. Examples of this class include a procedure with two parameters in which the first one is array and the second one is a value in the array.

KIND_4: The procedures cannot be tested separately, because some input test case parameters can be produced only by calling another procedure from the group and/or some outcome of tests can be analysed only by calling other procedures. Examples of this class include a procedure that provides stack operations and that receives the stack as a parameter.

KIND_5: The procedures cannot be tested separately. Part of the input and output data is hidden and the user does not have direct access to data. Examples of this class include instances of Object-Oriented classes with internal states; and a group of procedures that share a variable not visible to the procedure user.

Exception raising extension of API classes: The specific kind of procedures raise exceptions as a correct reaction to certain input test case parameters. Examples of this class include a procedure that is supposed to raise an exception after dividing by zero. If zero received as an input parameter, then this procedure must not return any return code.

Generating Test Sources

Figure 6:
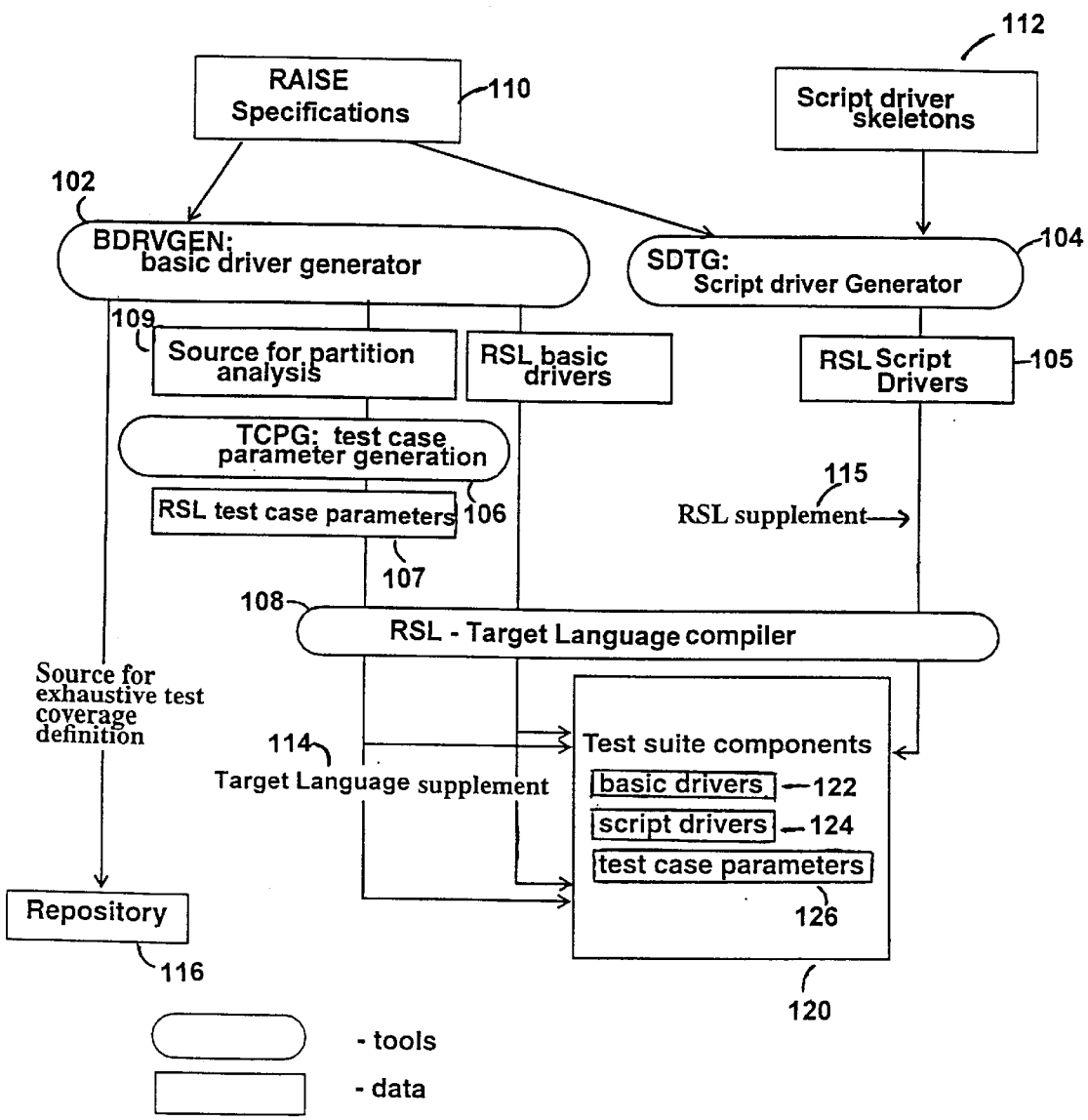
FIG. 6 is a diagram showing an example of test suite generation.

The generation of the test sources is further described referring to FIG. 6. FIG. 6 shows an example of the test generation for a KIL 43 using RAISE as implementation independent language.

The test source generator 100 comprises a basic driver generator 102, script driver generator 104 and test case parameter generator 106. In this example, the test source generator 100 uses UNIX, and the target SOS kernel 42 uses target language. The formal specifications 110 are generated in RSL. Accordingly, the test source generator 100 uses an RSL-target language complier 108 as an implementation language compiler.

The main source of the test source generation is the RAISE specifications 110. The RAISE specifications 110 are written in RSL. The RAISE specifications 110 may be those generated by the means 12 for generating specifications shown in FIG. 1 or those stored in the repository 116.

The basic driver generator 102 receives the specifications 110. The basic driver generator 102 is a tool for generating basic driver sources, i.e., RSL basic drivers 103. The RSL basic drivers 103 are testing procedures in RSL. The basic driver generator 102 executes analysis of the RAISE specifications 110. Based on the analysis results, the basic driver generator 102 generates testing procedure programs comprising the RSL basic drivers 103. That is, the basic driver generator 102 generates, as the RSL basic drivers 103, programs for checking input test case parameters, calling tested procedures, tracing and analysing the test results, assigning a verdict of the outcome, and outputting trace information.

The basic driver generator 102 preferably also generates source for test case parameter generation 109. The source 109 for test case parameter generation preferably includes source for partition analysis, as described below.

The results 103, 109 of the basic driver generator 102 are fully completed in RSL sources. RSL generated sources do not require any customization as they are implementation independent.

The RSL basic drivers 103 generated by the basic driver generator 102 are compiled by the RSL-target language compiler 108 into basic drivers 122 in the target language. The basic drivers 122 comprise target language procedures. Other than the language used, the RSL basic drivers 103 and the basic driver 122 in the target language are the same.

For each procedure in KIL 43, one basic driver 122 is generated. Each basic driver 122 provides direct call of a target procedure in KIL 43, and provides common facilities to test the target procedure. That is, each basic driver 122 takes input test case parameters for KIL 43, and checks pre-conditions of the target procedure. If the pre-conditions are correct, the basic driver 122 makes the call of the target procedure, and checks post-conditions of the target procedure.

The basic drivers 122 may carry out test result analysis by recording execution outcomes and comparing them with required outcomes. The basic drivers 122 may provide the result of the analysis as a verdict. The verdict may be either "passed" or "failed". The "passed" verdict means that no error is detected. The "failed" verdict means that an error is detected.

The basic drivers 122 may have a test oracle to automatically perform the analysis of the test outcome. The test oracle is a program that assigns a verdict on the correctness of outcome for the target procedure. The test oracle is similar to post-conditions. Both the test oracle and the post-conditions have Boolean functions. They have the same parameters, and return "True" if the target procedure produces a correct result and "False" otherwise. Accordingly, the test oracles can be generated once the post-conditions are generated.

The test result may depend on the SOS state and the history of SOS functioning. In order to fulfil its function, each basic driver 122 preferably also generates programs to support a model of SOS state. The model is used to check acceptability of test case parameters in different contexts and to analyse correctness of test results.

The test case parameter generator 106 receives the source for test case parameter generation 109 from the basic driver generator 102. Then, the test case parameter generator 106 generates test case parameter sources, i.e., RSL test case parameters 107. The RSL test case parameters 107 may be constant arrays or programs. The test case parameter programs are also fully completed RSL sources.

The test case parameter generator 106 may also generate test case parameter sources from the specifications.

The RSL test case parameters 107 are compiled into test case parameters 126 by the RSL-target language compiler 108. The test case parameters 126 are input parameters for procedures under testing. Therefore, they are used for basic driver procedures. The test case parameters 126 may include only numeric and/or boolean input parameters. For example, a KIL of SOS includes about 140 procedures which need only such input parameters. These procedures are called KIND_1 procedures, as described above.

The script driver generator 104 receives the RAISE specifications 110, and generates script driver sources, i.e., RSL script drivers 105. The RSL script drivers 105 are compiled by the RSL-target language compiler 108 into script drivers 124 in the target language. Other than the language used, and the RSL script drivers 105 and the script drivers 124 in the target language are the same. The script drivers 124 are the upper level of the basic drivers 122.

Each RSL script driver 103 is a program for testing of a procedure or a group of procedures. It is a sequence of target procedures calls. The sequence may have serial or parallel composition. The sequence may have iterations. The RSL script drivers 103, once complied into the script drivers 124 by the complier 108, realize a scenario or script of testing.

The script driver generator 104 generates, as the RSL script drivers 105, programs to realize the sequences of procedure execution with different test case parameters. The script driver generator 104 generates the RSL script drivers 105 to have no direct interaction with target procedures. That is, the RSL script drivers 105, once complied into the script drivers 124, call the basic driver 122. One or more RSL script drivers 105 may be written to be called by procedures which function as suppliers of test case parameters 126, or procedures that allow a system operator to control a procedure group testing.

The script driver generator 104 may also generate programs to check the verdicts of the basic drivers 122. The script driver generator 104 may also generate programs to assign script driver own verdicts based on the basic driver verdicts.

It is preferable that the script driver generator 104 uses script driver skeletons 112 in addition to the specifications 110. The script driver skeletons 112 describe general scheme of script drivers. That is, each script driver skeleton contains an algorithm of a script driver. The script driver skeletons 112 are specific to each kind of procedure interface.

Each script driver consists of declarations and a body. The declarations include import of the procedure under test and its data structure definitions and/or import of all data and types used in the specifications. The declarations are generated automatically based on the list of procedures under test and their specifications 110. The body of a script driver begins with the script driver option parsing. The options, as parameters of the script driver as a whole, determine the depth of testing, e.g., the level of test coverage criteria, and some specific data like interval of values, duration of testing.

In the example shown in FIG. 6, in order to generate an RSL script driver 105, the script driver generator 104 uses one of the skeletons 112 and the RAISE specifications 110. Union of the specifications 110 and skeletons 112 forms formal description of test suite sources. This formal description may be considered as a test suite specification. The test suite specification allows the generator 100 to define test coverage requirements, schemes of script drivers, and algorithm for checking target procedure behaviours.

The script driver skeletons 112 for a new target SUT may be manually developed or received from the repository 116. Before testing starts, the verification system carries out some initialization. For example, before testing write/read procedures, the verification system opens a file. Such initializations are written manually. After initialization is finished, the main part of the script driver begins.

In addition to specifications 110 and skeletons 112, the script driver generator 104 may also use some supplement sources, such as some instances of test case parameters values.

The script driver generator 104 may also use procedures that convert values derived from the RAISE specifications 110 into value formats used by the current version of SOS kernel 42. Because the specifications 110 are implementation independent, correspondence between the specifications 110 and implementation data structures is separately described. Thus, it is preferable to use some means for associating abstract objects with implementation objects. Some target language procedures convert data from their representation in implementation to and from their representation in the test suite 120. Such target language procedures may be used as the associating means. The target language procedures use post-conditions of the procedure under test. The target language procedures may be manually developed.

These additional sources including manually written skeletons may be called "manually developed components". The size of manually developed components is not large compared to the automatically generated components in the verification system generator 100.

For KIND_1 procedures, full automation of test generation is possible. All other kinds generally need some additional effort for writing manually developed components. The effort gradually grows from KIND_2 to KIND_5. The extensions require more effort than the corresponding kinds themselves. Complexity and effort for the development of manually developed components is usually caused by the complexity of the script driver generation and debugging. All script drivers for different classes of procedures have similar structure. The main distinction is the distribution between automatically generated components and manually developed documents. The KIND_1 script driver is generated fully automatically, KIND_2 script driver is generated almost automatically and so on.

The scheme of a script driver is further described in more detail using an example of a KIND_5 script driver.

The KIND_5 script driver realizes a general algorithm for traversing an abstract Finite State Machine (FSM). This algorithm passes all states and all possible transitions between the states. Each transition corresponds to an execution of a procedure under test.

The algorithm of a script driver is related to the specification and does not depend on the implementation details outside the specification. The script driver algorithm does not have direct descriptions of the abstract FSM. The verification system generator 100 avoids use of direct descriptions because direct specification of the FSM requires extra efforts to generate.

Instead of a direct specification of FSM, the verification system generator 100 uses indirect, virtual representation of FSM. Such representation includes a function-observer and a function-iterator. The function-observer calculates on the fly the current state in the abstract FSM. The function-iterator selects a next procedure from the target procedure group, and generates a tuple of the input parameter values for this procedure.

The KIND_5 script driver algorithm is described in more detail. For example, a case of testing a procedure group is considered. After passing several FSM states, i.e., some target procedures have been called, the next transition is being made. This elementary cycle of testing starts by calling a function-iterator that selects the next procedure from the target procedure group, and prepares a tuple of input test case parameter values for this target procedure. If the function-iterators have managed to generate a new and correct tuple without violation of pre-conditions, then the script driver calls a corresponding basic driver with the tuple as actual test case parameters.

When the basic driver returns a verdict, the control script driver checks the verdict assigned by the basic driver. If the verdict is "False", i.e., an error has been detected, the script driver produces corresponding trace data and finishes. If the verdict is "True", i.e., the elementary test case passed, the script driver calls the function-observer. The function-observer then calculates a current state, logs the state and transition, and continues to traverse FSM.

Thus, all possible states and test the procedures with all needed sets of input parameters may be obtained. FSM is used here as a guideline to pass through all states the needed number of times.

As described above, the script drivers are preferably composed following the requirements of the corresponding skeletons. In this embodiment, overall, the verification system generator 100 uses five skeletons needed for serial testing of API KIND-1 through KIND_5 and one skeleton for parallel testing. Based on a corresponding skeleton and the list of target procedures and specifications, the verification system generator 100 generates a script driver template for each class. A KIND_1 template is a ready-to-use program. The templates for the other kinds include several nests with default initiators and iterators. If a test designer does not need to add or improve anything in the nests, the template can be compiled by the RSL-target language compiler 108 and executed as a script driver 124. This situation is typical for a KIND_2 procedure interface. For other kinds, a test designer usually adds some specific initiators and iterators as RSL supplement 115. The test designer defines FSM state observer for the script drivers of KIND_4 and KIND_5.

In the generator 100, all kinds of generation by generators 102, 104, 106 produce results 103, 105, 107, 109 in RSL. This means that "front end" of specification and verification technology is implemented in implementation language independent form. All generators 102, 104, 106 can produce the components 122, 124, 126 of the test suites 120 for systems implemented in arbitrary programming languages.

Compilation of generated sources 103, 105, 107 by the RSL-target language compiler 108 may be carried out when generation of all sources 103, 105, 107 is completed. The RSL-target language compiler 108 translates executable subsets of RSL language into programs in the target language. Thus, the RSL-target language compiler 108 restricts RSL. These restrictions are typical for all RSL language compilers. For example, the RSL-target language compiler 108 does not treat explicit definitions of constants if the user does not define the concrete constant value but only defines limitations that restrict constant field of values.

The RSL-target language compiler 108 is implementation-language dependent.

The result of the RSL-target language compiler 108 is generally a group of complete target-language sections. This is a part of the target language module that consists of a few sections. For obtaining a target language program which is ready to execute, some target language sections with interface descriptions may be produced. Interfaces or behaviour of some procedures from SOS are written once and do not need to be rewritten repeatedly. The target language sections with interface descriptions may be produced manually. These target language sections may be called target language supplement 114.

In order to correctly use different generation/compiling tools, it is preferable to know interdependencies between modules of specifications and between results of generation/compiling, i.e., the target language sections, and other target language modules/sections that were manually developed or had been produced by other tools. These interdependencies may be represented by a graph. The complexity of such a graph of interdependencies depends on the size of the procedure interface under test.

For example, currently KIL consists of over 560 procedures divided into over 30 subsystems. For each subsystem, there exists, at least, a basic driver module, and as a whole there exist about 200 script driver modules. For each RSL driver, at least one target language module is generated and stored. Besides, the target language modules consist of a few sections and each section is stored in a separate file. As a whole, KIL requires over 10,000 files. In order to facilitate use of test generation/compiling tools, it is preferable to provide a work "manage" utility, as described later.

The basic drivers 122 invoked by the script drivers 124 are generated fully automatically. The only manually developed components called from basic drivers 122 are data converters of the RSL-target language compiler 108. As mentioned above, the converters transform the model data representation into the implementation representation and vice versa. A model representation is distinguished from the implementation one by the level of abstraction. For example, models may use "infinite" representation of integers, maps, relations, and other data structures suitable for specification. Sometimes model representation is very similar to the implementation one. In this case, such transformation is done by a standard translation algorithm of the specification language into the implementation language.

The verification system generator 100 is suitably used for generating a verification system for a continual evolving SUT. SOS may be evolved in accordance with its life cycle. During evolution cycle, requirements, interfaces or behaviour of some procedures from the SOS kernel, and implementation of SOS are repeatedly modified. For each new version of SOS, it is necessary to develop a new version of verification system. Therefore, it is beneficial to automate process of regeneration of the verification system.

Life cycle of test suites 120 generated by the verification system generator 100 replicates life cycle of the SOS Kernel 42. Usually, only a few interfaces or behaviour of some procedures from the SOS kernel are modified. The verification system generator 100 provides a possibility to re-specify modified interfaces or behaviour of some procedures from the SOS kernel and then re-generate test suites 120, and in doing so to provide re-use of old manually developed components. Thus, the verification system generator 100 can automate test suites regeneration. Therefore, existence of manually developed components does not decrease actual level of automation of the verification system generation.

To support automatic regeneration of test suites 120, the verification system generator 100 preferably stores in the repository 116 all manually developed components developed for generating the test suites 120 separately from automatically generated components. The manually developed components supplement automatically generated components. Therefore, process of the test suites components manually development may be called "supplement". Thus, the verification system generator 100 may use two kind of sources for generating test sources: formal specifications and some supplement sources. As automatically generated and manually developed components of the verification system generator 100 are stored separately, no manual changes in automatically generated components are needed. Therefore, the verification system generator 100 can eliminate need of customizing automatically generated files for each regeneration of the test suites 120.

To estimate effort for generating verification system, a volume of modified interfaces or behaviour of some procedures from the SOS kernel is first estimated. When no interface is modified during SOS evolution, then no test (re)generation is needed. In that case, only realization, i.e., implementation, of SOS is modified. Therefore, previous specifications 110 and previous test suites 120 can be used for validation of the new KIL.

When some interfaces or behaviour of some procedures from the SOS kernel are modified or added during SOS evolution, then corresponding specifications 110 need to be modified. When interface data structures are modified, in addition to specifications 110, some conversion procedures in the target language also need to be (re)developed. Those target language conversion procedures may be manually developed. In any case, some reasons for test plan modification may arise. For example, these modifications may be caused by wishes to increase amount of tests, decrease time of testing, to check correlation of some features for parallel execution and so on. In those cases, some manual modification to manually developed components may be needed. When manual modifications are completed, a test designer can automatically generate new test suites 120 for validation of the new SOS kernel by using the verification system generator 100.

In a simple case, it may suffice to modify the specifications 110 of types of pre-condition or post-condition of a target procedure. When new modification of procedure behaviour does not imply on behaviour of other procedure, the generator 100 needs only to regenerate a basic driver for verification of the modified procedure. In a complicated case, the generator 100 may need to regenerate totally new test suites including new basic drivers and script drivers. What volume of test suite modification is required depends on dependencies inside of the specifications 110 and between separate parts of the specifications 110 and test suites components 122–126 generated from these parts. Existing "manage" utility may be used which automates regeneration and recompiling of new test suites, as described later.

In order to port a test suite 120 generated by the verification system generator 100 from one implementation language platform to another, the data converters need to be rewritten and a new RSL to implementation language compiler needs to be provided. Also, a new run-time support system for the test suites with new test bed functions needs to be provided.

It is preferable that the verification system generator 100 also generates data for test coverage estimation and test plan design. The data is preferably kept in the repository 116.

Test coverage measures the completeness of testing. Sometimes, test coverage is presented as percentage of checked test situations. Sometimes, it is a list of test situations that have been or should be checked by the test suites. Test coverage requirements present all possible test situations that must be covered by test suites execution. If test suites 120 meet the requirements, then "exhaustive" or "100%" test coverage is gained.

There is a difference between test coverage estimation for source code and for specifications. In the case of source code, a test situation is associated with a statement, branch of path in control flow graph of a program. In the case of specifications, the specifications are represented as logical expressions, i.e., boolean expressions. Thus, test situations are associated with branches and disjuncts of boolean expressions. Therefore, by using test situations for specifications, it is possible to define test coverage requirements for arbitrary specifications. This allows uniform notation for description and accounting of the test situations, coverage requirements and obtained coverage.

The test suites are generated based on the specifications. The specifications are implementation independent. Thus, the test coverage is preferably measured by means of an implementation independent way. For this purpose, the verification system preferably uses test coverage criteria which are based on the specifications.

In complex SUTs, "all test situations" may not be covered. Accordingly, it is preferable to group similar test situations in classes. In this case, exhaustive coverage may represent coverage of all classes of test situations. Test situations and their classes may be identified and classified based on implementation source code or some external descriptions of the procedures under test. When a so-called "black box" approach is taken to test SUTs, test situations and their classes are identified and classified based on knowledge of descriptions of the procedures under test.

The test coverage criterion is a metric defined in terms of implementation or specification. The most well known test coverage criteria in terms of implementation are:

Class 1—all statements are passed; and

Class 2—all branches are passed.

In the case of using the specifications for test coverage criteria definition, is the so-called domain testing approach is preferably used. The whole input space is partitioned into areas by the basic driver generator. Each area corresponds to a class of equivalence.

The source for test case parameter generation 109 generated by the basic driver generator 102 preferably includes source for the partition analysis. The partition determines the choice of one of the test generation techniques applicable to a procedure interface or an interface of a procedure group. The source for partition analysis includes a list of test situation classes that represent test coverage requirements, and initial data for partition analysis. The source for partition analysis is used to generate test case parameters 126.

The partition may be derived from the specifications that describe requirements on input and properties of outcome for target procedures. Both the requirements and properties are represented in pre-conditions and post-condition of formal specifications in implicit form. Accordingly, the test coverage estimation can be carried out based on the implicit specifications. In this example, the average percentage of the test coverage of the verification system generated by the generator 100 for SOS KIL is 70% to 100% of statements in the implementation.

Furthermore, there are two levels of the test coverage criteria. The first one is the coverage of all branches in post-conditions. The second one is the coverage of all disjuncts, i.e., elementary conjunctions, in the Full Disjunctive Normal Form (FDNF) representation of the post-condition while taking into account the precondition terms. The verification system generator 100 allows automatic partitioning in terms of specification branches and FDNF. It is preferable to calculate accessible FDNF disjuncts and remove the inaccessible FDNF disjuncts using pre-condition design.

Monitoring of obtained test coverage is preferably conducted on the fly by script drivers 124. Based on this data, the script drivers 124 may tune testing parameters and/or testing duration.

As described above, the verification system generation consists of a sequence of steps. For a step, needed tools are used where possible. Some tools generate auxiliary data, others convert and union their output and generate resulting target language code. To facilitate usage of these tools, it is preferable to use "manage" utility. The "manage" utility is a tool which works on a standard structure of UNIX directory where the tools and sources for verification system generations and generated test suites are stored.

The "manage" utility works like UNIX "make". It analyses an interdependencies graph which represents interdependencies of the test suite components, and searches "inconsistencies" in the graph. Each "inconsistency" requires to make some kind of generation and compiling. After the "manage" utility removes all "inconsistencies", all needed test suites components become ready to use. The "manage" utility uses a set of UNIX scripts and UNIX "make" files. The "manage" utility uses description of paths for all files used. It is preferable to define a "standard" directory structure to store sources and generated files for generating verification systems, and directories of the verification system generator.

Test Execution and Testing Result Analysis

Referring back to FIG. 1, the verification system 2 is generated by compiling the test suite sources using the implementation language complier 18 as described above. The generated test suites are then loaded into the target SUT 3. During the test execution, the contents of the repository 16 are used and updated.

In order to execute the tests on the SUT 3, eg, the SOS kernel, it is preferable that the verification system 2 uses a test harness 20. The test harness 20 is a software system used in the process of test execution and communicating with a target SUT 3.

Figure 7:
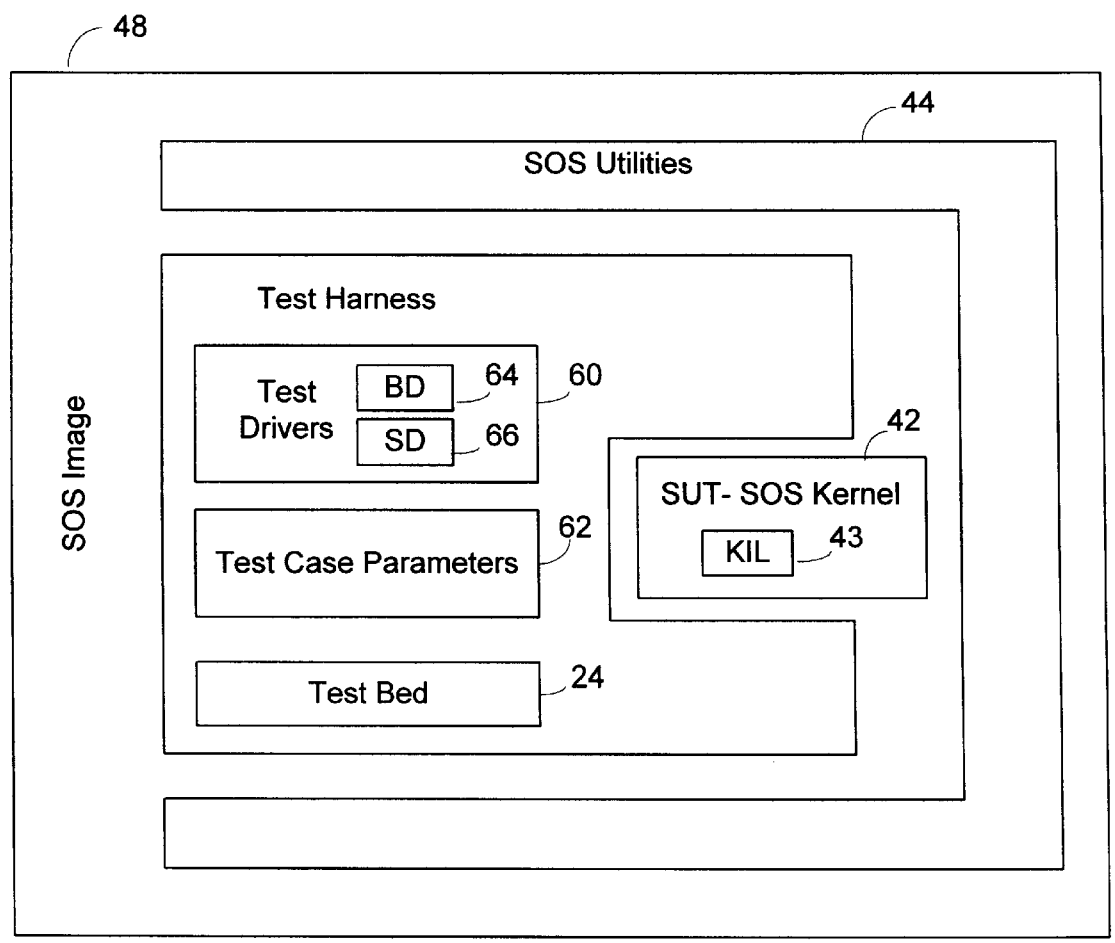
FIG. 7 is a diagram showing an example of test harness environment.

FIG. 7 shows an example of the test harness environment using the test suites 22. The test harness 20 comprises the test suites 22 and test bed 24. The test suites 22 comprises test drivers 60 including basic drivers and script drivers, and test case parameters 62.

The test bed 24 is a run-time support and some infrastructure features for test execution to enable functionality of the test drivers 60. The test bed 24 is a resident component of the verification system 2 located in SUT image, e.g., SOS image 48. During the test execution, the test harness 20 and SOS Kernel 42 form an instance of SOS image 48. This image 48 is a binary code structure that may be executed on a DMS switch.

In order to facilitate test execution, it is preferable that the verification system 2 uses a "Test Integrated Environment (TIE)" 26, as shown in FIG. 1. The TIE 26 comprises a set of tools for executing test execution features and test analysis features. Some of the tools may be stored in repository, and others may be stored in separate files, e.g., UNIX files. The tools of the TIE 26 are executed under UNIX on a front-end computer or other OS. The test harness 20 with the SOS Kernel 42 is executed on the target hardware, e.g., DMS.

Figure 8:
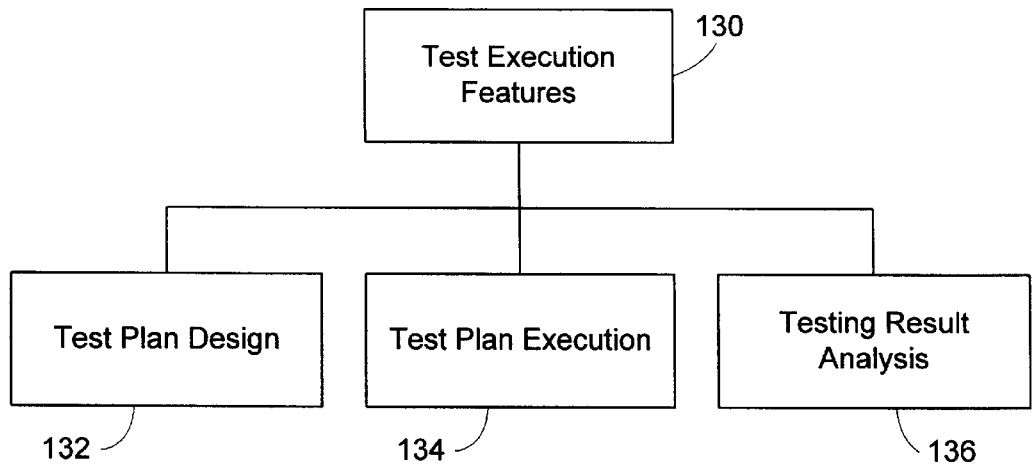
FIG. 8 is a diagram showing an example of test execution features.

FIG. 8 shows test execution features 130. The test execution features 130 include test plans design 132, test plans execution 134 and testing result analysis 136.

A test plan is a program that defines the order of script driver calls with the given test options. The test plan also checks the script driver call conditions and termination correctness.

Each test plan fulfils testing of a set of subsystems of SOS Kernel 42. A subsystem is a set of procedures. An elementary component of a test plan is a test sequence. A test sequence is an instance of script driver execution with corresponding parameters. A test plan defines a serial or parallel order of test sequences. The purpose of the test plan is to check behaviour of subsystems under test in definite compositions. The test plan controls and manages test sequence execution. This control is executed by feedback which executes analysis of trace information. An algorithm of the test plan is called a test script.

Besides the set of basic drivers, script drivers and test case parameters, the test harness may also contain a test plan interpreter, a repository and tools for test plan execution and querying the results kept in the repository. The repository contains information about all test executions, code coverage metrics for different procedures with different test coverage criteria, and all situations when test drivers assigned a negative verdict.

Such test plan interpreter, repository and tools may be provided separately from the test harness.

The test scripts are preferably described in a script language. The script language is a lightweight programming language. In general, all possibilities provided by the script language may be realized by means of implementation language or other programming language. But, if those implementation languages are used, in order to compose ready-to-use script drivers, a test designer would have to implement usual programs and have to face usual troubles of linking/loading/debugging. However the script language allows to facilitate producing large variety of test sequence compositions for trial of large variety of test situations. Thus, it avoids wasting of time for compiling, linking and debugging usual for implementation language programs.

Source materials for the test plan design 132 are script driver informal description and test coverage requirements for the target subsystem(s).

The script driver description includes script drivers options description of resources needed for different options. Besides, the description may declare possibility or impossibility of sequential or parallel composition of this script driver with other script drivers.

Test plan for testing concurrent procedures

According to the present invention, testing of procedures is performed separately depending on behaviour of procedures under test.

The procedures are called in two different modes: a consecutive mode and a parallel mode. A consecutive mode is a mode in which procedures are called from sequential processes without parallelism. This is also called a sequential mode. A parallel mode is a mode in which procedures are called from parallel processes.

Behaviour of procedures in the two modes is specified separately. Testing of the procedures is also carried out separately for the two modes.

Figure 10:
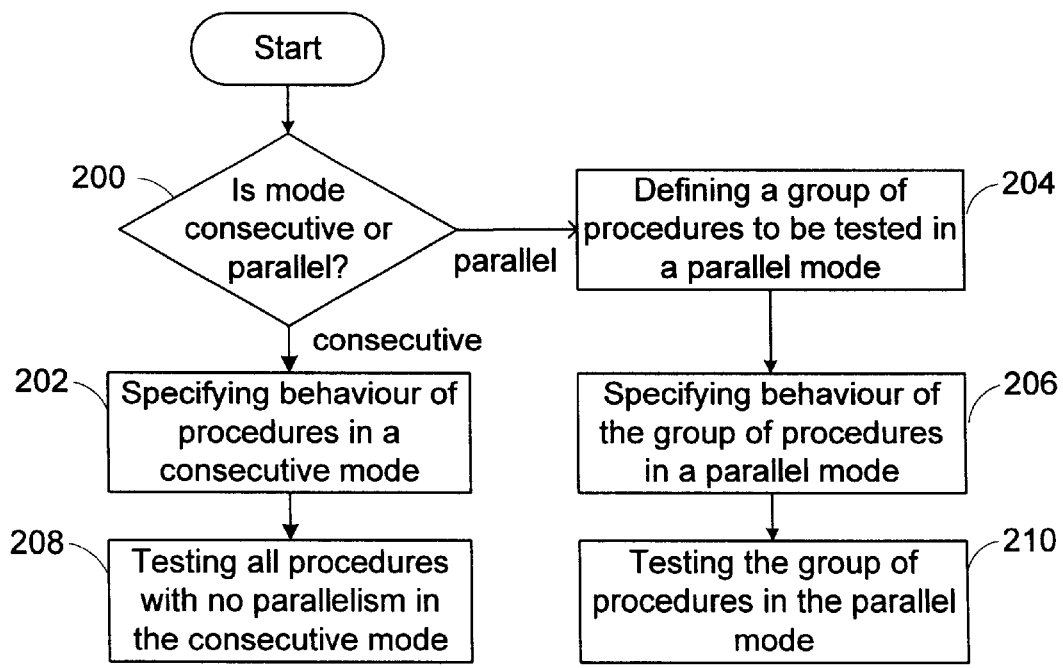
FIG. 10 is a flowchart showing a method of testing behaviour of procedures in accordance with an embodiment of the present invention.

As shown in FIG. 10, the procedures are separated into two modes (200). For the consecutive mode, behaviour of one or more procedures is specified in a consecutive mode (202). A group of procedures may be defined for test suite. It means that when the procedures of the group deal with common data, for example, global variable, these procedures are tested together as a group.

The behaviour in consecutive mode is defined by implicit specification, i.e., by the logical expression that is equal to "true" for any correct results of the procedure call. When the specification for consecutive mode is written, existence of a parallel call of any procedure is considered. For example, consider for writing the specification of the procedure Wait_message ( ) in case of empty mailbox. The correct results could be the result "No messages" and the result "message", because during the procedure Wait_message ( ) call, another parallel process could call the procedure Send_message ( ) and write the message into the mailbox.

For the parallel mode, a group of procedures, behaviour of which is to be tested in a parallel mode, is defined (204) by analyzing the semantic of the target programs. Requirements of the customers are also taken into account when the group of procedures is defined. The behaviour of the procedures of the group is specified in the parallel mode (206).

Testing for the procedures in the consecutive mode is carried out separately from the parallel mode (208). That is, the verification system generator 1 generates test suites 22 for the target procedures, as described above. The test suits 22 include, in particular, basic drivers 122 having oracles, script drivers 124 and test parameters 126, i.e., in-parameters that are input for testing. Oracles are programs for checking if values returned from testing procedures correspond to the values of in-parameters from a particular test parameter set. The script drivers 124 test all target procedures having no parallelism by calling the oracles and applying them to the target procedures in the consecutive mode.

Testing for the group of procedures in the parallel mode is carried out separately from the consecutive mode (210). This step is carried out using two models of correct parallel behaviour of procedures: namely, a completely independent behaviour model and a dependent or serialized behaviour model.

The completely independent behaviour model is a model in which the behaviour of procedures is equal to their behaviour in a consecutive mode. That is, the execution of the parallel processes has no impact on the behaviour of those procedures.

The serialized behaviour model is a mode in which the result of parallel execution of a group of procedures is equivalent to a sequence of their execution without parallelism.

The main reason for determination of the type of the model is the semantic of the procedure group. For example, a procedure group dealing with only user process information has an independent behaviour. That is, if the process calls the procedure from this group, the result of the call depends on only the previous calls of this process, not on the parallel calls by another processes. Examples of such a independent model include mathematical functions like sin( ), exp( ).

The serialized behaviour model with predetermined sequences is used when the procedure group uses the common information and the different processes call the different procedures from the group. Examples include the procedures Send_message ( ) and Wait_message ( ) with common mailbox. If one process calls Send_message ( ) and in parallel the other process calls Wait_message ( ) for empty mailbox, the predetermined sequence is Send_message ( ); Wait message ( ).

Figure 11:
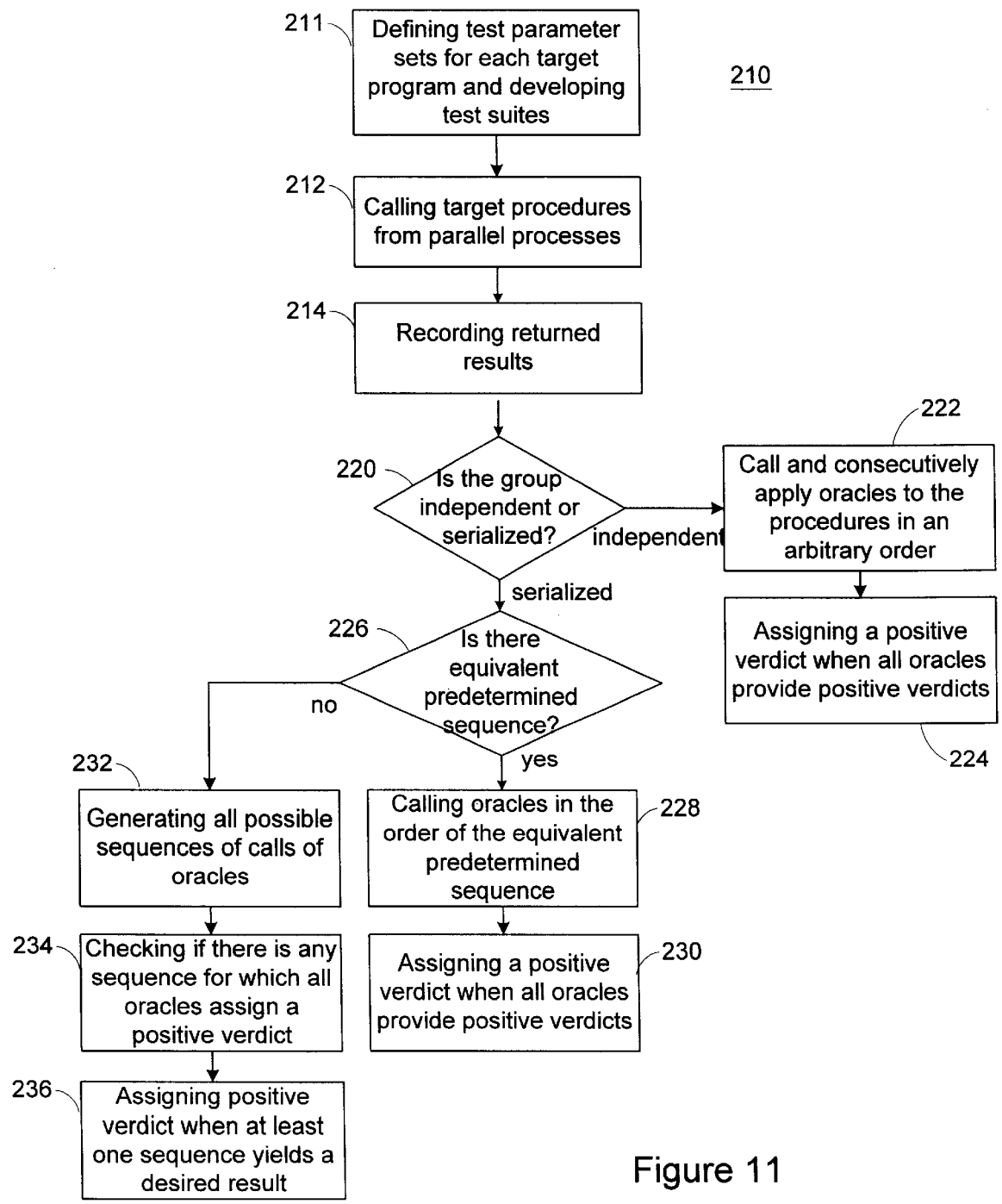
FIG. 11 is a flowchart showing the testing of a group of procedures in a parallel mode.

The testing of the group of procedures in the parallel mode (210) is described referring to FIG. 11.

The verification system generator 1 generates a test suite 22 for the group of procedures (211). The test suite 22 includes basic drivers 122 having oracles, script drivers 124 and test parameters 126, as described above. The test parameters 126 are defined for each target procedure. During testing, the script drivers 124 call the target procedures from parallel processes with corresponding sets of in-parameters (212). For each call, the output parameters of the target procedure including the result of the procedure, i.e., out-parameters, are recorded (214).

Based on the returned results, the group of procedures is specified if it is a completely independent model or a serialized model (220).

If the group of procedure is a completely independent behaviour model (220), the script drivers 124 call the oracles and sequentially apply them to the group of procedures in an arbitral order (222).

The oracles take the sets of in-parameters with which real calls of procedures were made, and appropriate out-parameters. If all oracles assign a positive verdict, the group of procedures is assigned with a positive verdict (224).

Otherwise, the group of procedures is assigned with a negative verdict.

If the group of procedures is a serialized behaviour model (220), the group of the procedures is checked to see if there is any sequence of calls of procedures that is equivalent in results to the parallel execution of the group of procedures. If there are any additional restrictions on the values of returned parameters, they are also defined.

In order to facilitate the checking of equivalent sequences, it is preferable to use some predetermined sequences of calls of procedures. The predetermined sequences are checked if any of them is equivalent to the parallel execution of the group of procedures (226).

If one or more predetermined sequences are equivalent to the parallel execution of the group of procedures (226), the script drivers 124 test the group of procedures by calling the oracles in the equivalent predetermined sequences (228). If there are additional restrictions on the values of out-parameters, they are also imposed on the returned values and checked. If all oracles in an equivalent sequence assign a positive verdict, and all returned values conform to any additional restrictions, a positive verdict is assigned to the group of procedures (230). Otherwise, a negative verdict is assigned to the group of procedures.

If there is no equivalent predetermined sequences located (228), all possible sequences of calls of procedures are generated (232). Every generated sequence determined the order of calls to the oracles. If there is at least one generated sequence for which all oracles assign a positive verdict, the generated sequence is considered as equivalent to the parallel execution of the group of procedures (234). In that case a positive verdict is assigned to the group of procedure (236). If for all generated sequences even one oracle assigns a negative verdict, the overall negative verdict of parallel testing is assigned to the group of procedures.

Thus, procedures are tested systematically. Accordingly, the testing parallel behaviour of procedures according to the present invention reduces cost and efforts required, and increases reliability.

Figure 12:
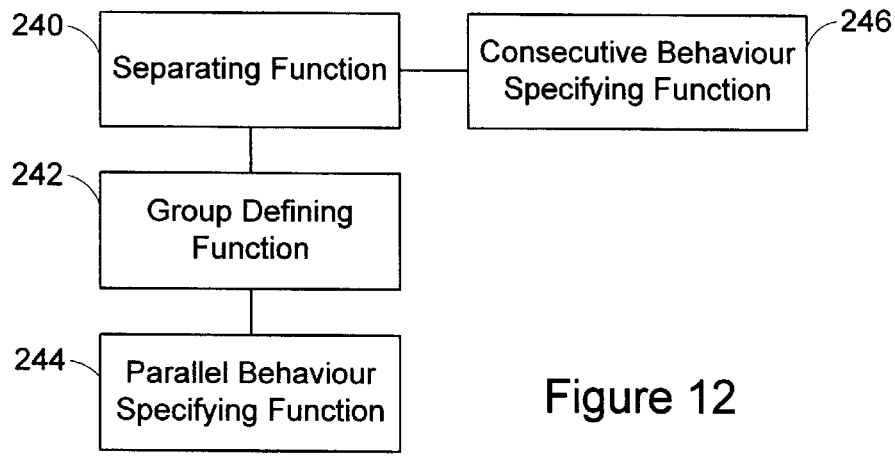
FIG. 12 is a diagram showing a test plan design function in accordance with an embodiment of the present invention.

In order to carry out the above described testing of concurrent procedures, the test plan design feature 132 may comprise, as shown in FIG. 12, a separating function 240 for separating parallel procedures from consecutive procedures, a group defining function 242 for defining a group of parallel procedures to be tested in a parallel, a parallel behaviour specifying function 244 for specifying behaviour of the group of procedures in a parallel mode; and a consecutive behaviour specifying function 246 for specifying behaviour of one or more procedures in a consecutive mode.

Figure 13:
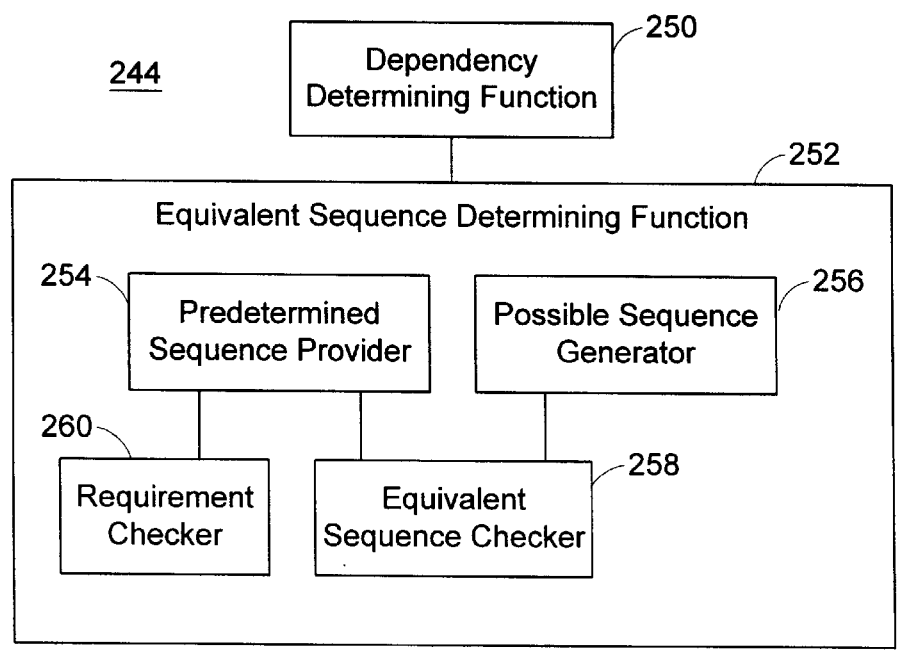
FIG. 13 is a diagram showing an example of parallel behaviour specifying function.

As shown in FIG. 13, the parallel behaviour specifying function 244 has a dependency determining function 250 for determining if the behaviour of the group of procedures to be tested in a parallel mode is independent from parallel calls by another processes, and an equivalent sequence determining function 252 for determining if the behaviour of the group of procedures is equivalent to a sequence of their execution without parallelism.

The equivalent sequence determining function 252 has a predetermined sequence provider 254, a possible sequence generator 256 and a equivalent procedure checker 258. The predetermined sequence provider 254 provides predetermined sequences of calls of procedures. The possible sequence generator 256 generates all possible sequences of calls of the group of procedures. The equivalent procedure checker 258 checks if there is any sequence that is equivalent to the parallel execution of the group of procedures.

The parallel behaviour specifying function 244 may also have a additional restriction checker 260 which checks if there are any additional restrictions imposed on returned values of calls of procedures.

Test Execution

Figure 9:
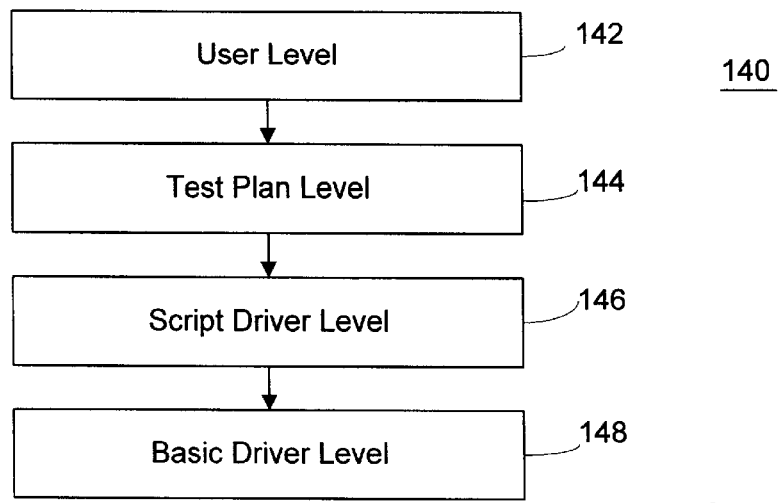
FIG. 9 is a diagram showing an example of test execution levels.

As shown in FIG. 9, the test execution 134 uses a hierarchical structure 140 comprising a user level 142, test plan level 144, script driver level 146 and a basic script level 148.

At the user level 142, test plans are activated by the user or by means of batch file execution in a test program. This level is intended for users of the verification system. The users execute test plans and receive the analysis results.

At the test plan level 144, a script driver is launched by a test plan. This level is intended for test plan designers who are also users of the verification system.

The introduction of the test plan level 144 and use of the script language specifically facilitate producing large variety of test sequence compositions for trial of large variety of test situations.

The introduction of the test plan level 144 also provides a possibility of feedback usage for script driver monitoring. The verification system supports two kinds of feedback information generated by the test drivers: verdicts and trace events shown by test coverage.

At the script driver level 146, the basic driver is called by a script driver. This level is intended for test designers who generate or write test suite components.

At the basic driver level 148, an interface procedure is called by the basic driver. Nobody has any access to this level. The basic driver is generated automatically, as described above. This level fulfils common functions of target procedure behaviour checking and tracing.

In the testing result analysis 136, verdict analysis is simple and is not informative. Verdict may be "PASSED" or "FAILED". All script drivers can analyse verdicts obtained from its governed basic driver.

Test coverage is a measured for estimation of quality, i.e., fullness, of testing. Direct goal of introduction of such measure is to decide if a test suite is complete or not. The test coverage indirectly defines a criterion of test selection. For test coverage analysis, the TIE 26 uses description of all possible test situations that can arise during a procedure or subsystem testing. The TIE 26 compares test coverage requirements stored in repository 16 and trace information obtained from SOS Kernel 42 during testing.

The test coverage requirements for the target subsystem(s) use knowledge of a set of test situations. Test situations can be used for feedback. For example, a test plan may iteratively launch a script driver with different options until a certain test situation has been passed. Test coverage requirements are preferably generated automatically by the basic driver generator 34, as described above.

The verification system 2 may not provide any special tool for the test plan design 132. The test plans may be placed in UNIX files.

For the test plan execution 134, the TIE 26 may provide a navigating tool 27. The navigating tool 27 provides a graphical user interface to browse specifications and testware to run test and analyse test results. The navigating tool 27 is executed on a front-end computer. It communicates with the target hardware 6 or with the target hardware emulator. In order to invoke a test plan, the user of the verification system 2 may push a section in the navigating tool graphic interface of the TIE 26.

During test execution, the test drivers in cooperation with the TIE 26 collects trace information generated by the test drivers. The trace allows to estimate completeness of the test coverage.

The verification system 2 is intended for trial of non-stable (unreliable) SUT functioning. In particular, when a failure of the SUT 3 or the verification system 2 has raised during a test plan execution, it is preferable that the TIE 26 does not stop process of testing. In that case, the TIE 26 preferably stores the received trace information, then reloads the SUT 3, and continues to execute testing in accordance with list of test plans. Such scheme of testing may be called "incremental testing".

It is easy for many users to use a navigating tool which is an interactive tool for specifications, testware browsing, test execution and test result analysis. However, manual test execution means may also be suitably used.

Test execution and test result analysis features are preferably grouped in Test Integrated Environment (TIE) as described above. A user interface is provided in the TIE by the navigating tool. All other components of the verification system are hidden by the shell of the navigating tool.

The navigating tool is intended to analyse test execution results, to navigate through the test suite directory tree and to browse test plans, script drivers, procedures and their specifications.

The user interface of the navigating tool may use a Graphical User Interface (GUI). It may be Hyper Text Markup Language (HTML) document sets and Common Gate Gateway Interface (CGI) scripts.

The navigating tool may provide choices to, e.g., view subsystems, procedures, script driver kinds, script drivers, test plans and directories tree structure. The test plans link may be used to navigate through test plans available in the test system and to observe results of the test execution. When the user selects a test plan and choose a server on which those tests should be run, the navigating tool executes the tests using corresponding CGI scripts.

To build the entire set of all test situations, a CGI script finds its subsystems for each procedure in a trace log. Also, for all subsystems from set constructed in the previous step, it merges their test situations to build an available test situations set. The user may force the navigating tool to exclude subsystems selected by the user from consideration during report generation to decrease the test situations set. This is useful when test plan invokes script drivers that call the procedures, which are not under test. Such additional procedures prevent the user from true coverage percentage calculation.

The test coverage report may contain a number of and percentage of covered branches, a number of and percentage of covered disjuncts, and values about number of and percentage of covered procedures, branches and disjuncts.

The execution log may allow to, e.g., show time stamp, exclude script messages, exclude process died notification, exclude precondition failure, exclude incorrect post parameter message, hide basic driver fault, show no script driver warning, hide script driver fault, show no script driver message. The show time stamp option directs browser to precede each line in the report by time stamp value when given event was registered.

It is preferable that the verification system generator 1 also provides facilities for installation and maintenance. Installation consists of construction and filling a directory structure, setting environment variables and adding the user/administrator profiles. Utilities for installation are relatively simple.

The maintenance facilities covers updating of specifications and other sources for test suites generation; generation/compiling of test suites; and trial of new modified state of the verification system 2. The sources for test suites generation may be developed or modified remotely.

For each kind of above facilities, the verification system generator 1 may be provided with the corresponding utilities. If maintenance facilities do not have any restriction on resources, these utilities may be used in fully automatic manner. In general, modification of the verification system 2 may need to be performed step by step, for example, first generate a basic driver and second generate script drivers.

While particular embodiments of the present invention have been shown and described, changes and modifications may be made to such embodiments without departing from the true scope of the invention. For example, the present invention is described mainly using the verification system generator for verifying the SOS kernel. However, the present invention is suitably used for verifying a different system, such as a base level of call processing system, and a management system of tree-like store for queues with different disciplines. The present invention is mainly disclosed using RSL specifications. However, natural language documentation may also be used. Also, the present invention is mainly disclosed using UNIX. However, other operating systems may also be used.

What is claimed is:

1. A method for testing procedures, the method comprising the steps of
    separating parallel procedures from consecutive procedures which have no parallelism;
    defining a group of parallel procedures to be tested in a parallel mode;
    specifying behaviour of the group of procedures in the parallel mode by determining if the behaviour of the group of procedures is independent from parallel calls by another process;
    testing the group of procedures in the parallel mode separately from the consecutive procedures, based on the specified behaviour; and
    testing the group of procedures by calling oracles consecutively in an arbitrary order when the behaviour of the group of procedures is independent.

2. The method as claimed in claim 1, wherein the separating step comprises a step of separating a procedure as a consecutive procedure when the behaviour of which is defined by implicit specification.

3. The method as claimed in claim 2, wherein the step of testing further comprises a step of assigning a positive verdict when all oracles provide positive verdicts.

4. The method as claimed in claim 1, wherein
    the step of specifying comprises a step of determining if the behaviour of the group of procedures is equivalent to a sequence of their execution without parallelism; and
    the step of testing comprises a step of testing the group of procedures by calling oracles in the equivalent sequence.

5. The method as claimed in claim 4, wherein the determining step comprises steps of:
    providing predetermined sequences of calls of procedures; and
    checking if one or more predetermined sequences are equivalent to the parallel execution of the group of procedures.

6. The method as claimed in claim 5, wherein the step of testing further comprises a step of assigning a positive verdict when all oracles provide positive verdicts.

7. The method as claimed in claim 5, wherein the determining step further comprises a step of checking additional restrictions imposed on returned values of calls of procedures; and
    the step of testing further comprises a step of assigning a positive verdict when all oracles provide positive verdicts and all returned values conform to the additional restrictions.

8. The method as claimed in claim 5, wherein the determining step comprises steps of:
    generating possible sequences of calls of the group of procedures when there is no predetermined sequence which is equivalent to the parallel execution of the group of procedures; and
    locating one or more generated sequences which are equivalent to the parallel execution of the group of procedures.

9. The method as claimed in claim 8, wherein the step of testing further comprises a step of assigning a positive verdict when at least one sequence yields a desired result.

10. A test plan design system for planning testing of procedures, the system comprising:
    means for separating parallel procedures from consecutive procedures which have no parallelism;
    means for defining a group of parallel procedures to be tested in a parallel mode;
    means for specifying behaviour of the group of procedures in the parallel mode; and
    a test suite for testing the group of procedures in the parallel mode separately from the consecutive procedures, based on the specified behaviour and wherein
    the specifying means comprises means for determining if the behaviour of the group of procedures is independent from parallel calls by another process; and
    the test suite having a script driver and oracles, and the script driver calls the oracles consecutively in an arbitrary order when the behaviour of the group of procedures is independent, and calls the oracles in a specific order when the behaviour of the group of procedures is dependent.

11. The system as claimed in claim 10, wherein the oracles assign a positive verdict when all oracles provide positive verdicts when the behaviour of the group of procedures is independent.

12. The system as claimed in claim 10, wherein
    the specifying means further comprising equivalent sequence determining means for determining if the behaviour of the group of procedures is equivalent to a sequence of their execution without parallelism when the behaviour is dependent on parallel calls of another process.

13. The system as claimed in claim 12, wherein the equivalent sequence determining means comprises:
    means for providing predetermined sequences of calls of procedures; and
    means for checking if one or more predetermined sequences are equivalent to the parallel execution of the group of procedures.

14. The system as claimed in claim 13, wherein
    the script driver calls the oracles in a predetermined sequence when the predetermined sequence is equivalent to the parallel execution of the group of procedures; and the oracles assign a positive verdict when all oracles provide positive verdicts.

15. The system as claimed in claim 13, wherein the equivalent sequence determining means further comprises means for checking additional restrictions imposed on returned values of calls of procedures; and the oracles assign a positive verdict when all oracles provide positive verdicts and all returned values conform to the additional restrictions.

16. The system as claimed in claim 13, wherein the equivalent sequence determining means comprises:

means for generating possible sequences of calls of the group of procedures when there is no predetermined sequence which is equivalent to the parallel execution of the group of procedures; and means for locating one or more generated sequences which are equivalent to the parallel execution of the group of procedures.

17. The system as claimed in claim 16, wherein the oracles assign a positive verdict when at least one sequence yields a desired result.

18. The system as claimed in claim 10, wherein the specifying means specifies behaviour of the consecutive procedures, and the test suite tests the consecutive procedures separately from the parallel procedures.

19. A verification system generator for generating a verification system for verifying a Procedure Interface Under Test (PIUT), the verification system generator comprising:

means for producing formal specifications of procedures of PIUT in a form independent from implementation of the PIUT;

a test source generator for generating test sources based on the formal specifications said test source generator comprising:

a test driver generator for generating test driver sources which are used to produce test drivers that execute tests and analyze results of the tests in implementation environments of the PIUT; and a test case parameter generator for generating test case parameter sources which are used to produce test case parameters used by the test drivers for test execution; and a repository for storing the generated formal specifications and test sources.

20. The verification system generator as claimed in claim 19, wherein the test driver generator includes:

a basic driver generator for general basic driver sources, the basic driver generator analyzing the formal specifications, and generating program sources of a basic driver for each PIUT; and a script driver generator for generating a script driver source which describes a sequence of calls to the basic driver with different test case parameters.

21. The verification system generator as claimed in claim 20, wherein the basic driver sources are used to produce basic drivers in a form independent from implementation of the PIUT, each of the basic drivers corresponding to each PIUT and, during the test execution, provides direct call of its corresponding PIUT, tests the corresponding PIUT, and traces and analyzes test results of the corresponding PIUT.

22. The verification system generator as claimed in claim 20, wherein the basic driver generator further generates a list of test situation classes that represent test coverage requirements.

23. The verification system generator as claimed in claim 20, wherein the basic driver generator further generates initial data for partition analysis of the PIUT for the test case parameter generator to generate the test case parameter sources.

24. The verification system generator as claimed in claim 23, wherein the test case parameter generator receives the initial data from the basic driver generator, and generates programs for obtaining the test case parameters.

25. The verification system generator as claimed in claim 20, wherein the script driver sources are used to produce a script driver in a form independent from implementation of the PIUT, the script driver controls a sequence of calls to the basic drivers and the test case parameters during the test execution.

26. The verification system generator as claimed in claim 25, wherein the script driver further controls serial and parallel literations of the test execution of the corresponding PIUT with different test case parameters.

27. The verification system generator as claimed in claim 20, wherein the script driver generator uses script driver skeleton description and PIUT prototype specification.

28. The verification system generator as claimed in claim 19 further comprising an implementation language compiler for compiling the test sources into an implementation language of the PIUT.

29. The verification system generator as claimed in claim 28, wherein the test source generator further comprises a manage utility which analyzes interdependencies between the formal specifications and between the tests generated and compiled by the verification system and programs generated by other systems, searches inconsistencies, and removes the searched inconsistencies.

30. A method of producing a verification system for verifying a Procedure Interface Under Test (PIUT), the method comprising the steps of:

generating formal specifications of the PIUT in a form independent from implementation of the PIUT; and generating test sources based on the formal specifications, which test sources are used to generate a test suite in a form independent from implementation of PIUT for executing tests and analyzing test results to verify the PIUT, wherein generating test sources comprises the step of generating constant arrays and programs for generating and selecting needed test case parameters.

31. The method as claimed in claim 30, wherein the step of generating formal specifications comprises the steps of:

defining PIUT;

developing implementation independent description of the PIUT; and deriving the formal specifications based on the implementation independent description.

32. The method as claimed in claim 30, wherein the step of generating formal specifications uses Rigorous Approach to Industrial Software Engineering (RAISE) Specification Language (RSL).

33. The method as claimed in claim 30, wherein the step of generating test sources comprises the steps of:

generating test driver sources which are used to produce test drivers that execute tests and analyze results of the tests in implementation environments of the PIUT;

generating test case parameter sources which are used to produce test case parameters used by the test drivers for test execution; and creating test plans for carrying out tests based on the formal specifications.

34. The method as claimed in claim 33, wherein the step of generating test driver sources comprises the step of generating basic driver sources by analyzing the formal specifications, and generating program sources of a basic driver for each PIUT.

35. The method as claimed in claim 34, wherein the step of generating test driver sources further comprises the step of generating script driver sources by creating skeletons describing a general scheme of the script driver, and generating script driver sources based on the formal specifications and the skeletons.

36. The method as claimed in claim 34, wherein the step of creating test plans comprises the step of describing scripts for test execution, the scripts defining test sequences, each test sequence being an instance of a basic driver with definite test case parameters.

37. The method as claimed in claim 36, wherein the step of describing scripts uses a special script language which facilitates serial and parallel combination of the test sequences.

38. The method as claimed in claim 33, wherein the step of creating test plans includes the step of generating data for test coverage estimation.

39. The method as claimed in claim 30 further comprising the step of storing the generated formal specifications and test sources in a repository.

40. The method as claimed in claim 39, wherein the step of storing comprising the steps of:
separating manually developed components from automatically generated components; and
separately storing the manually developed components from the automatically generated components.

41. The method as claimed in claim 40, wherein the step of generating test sources includes the step of re-generating test sources using the manually developed components when the PIUT is modified.

42. The method as claimed in claim 41, wherein the step of re-generating test sources is carried out automatically.

43. The method as claimed in claim 30 further comprising the step of compiling the test sources into an implementation language used by the PIUT.

44. The method as claimed in claim 43, wherein the step of compiling the test sources includes the step of describing correspondence between the formal specifications and implementation data structures of the PIUT.

45. The method as claimed in claim 43, wherein the step of compiling the test sources using converting procedures that convert values derived from the formal specifications into value formats used by the PIUT.

46. A method of verifying a Procedure Interface Under Test (PIUT), the method comprising the steps of:
generating formal specifications of the PIUT in a form independent from implementation of the PIUT;
generating test sources based on the formal specifications including the step of re-generating test sources using the stored formal specifications and test sources when the PIUT is modified;
storing the formal specifications and the test sources in a repository;
compiling the test sources into an implementation language used by the PIUT to produce tests;
executing the test on the PIUT using tests compiled from the re-generated test sources on the modified PIUT; and
analyzing results of the tests to verify the PIUT.

47. The method as claimed in claim 46, wherein the step of executing tests comprises the step of using the generated test sources when only implementation of PIUT is modified.

48. The method as claimed in claim 46, wherein the step of executing the tests includes the step of generating and collecting trace information of the tests; and
the step of analyzing results comprises the step of estimating completeness of test coverage using the trace information.

49. The method as claimed in claim 46, wherein the step of generating test sources comprises the steps of:
generating test driver sources which are used to produce test drivers that execute tests and analyze results of the tests in implementation environments of the PIUT;
generating test case parameter sources which are used to produce test case parameters used by the test drivers for test execution; and
creating test plans for carrying out tests based on the formal specifications; and
the step of compiling comprises the steps of:
compiling the test driver sources into the test drivers; and
compiling the test case parameter sources into the test case parameters.

50. The method as claimed in claim 49, wherein the step of executing the tests includes the steps of:
initializing the PIUT;
calling the test drivers with test case parameters in accordance with the test plans; and
receiving results of the tests.

51. The method as claimed in claim 49, wherein the step of generating test driver sources comprises the steps of:
generating basic driver sources by analyzing the formal specifications for each PIUT; and
generating script driver sources by creating skeletons describing a general scheme of the script driver and generating script driver sources based on the formal specifications and the skeletons; and
the step of compiling the test driver sources comprises the steps of:
compiling the basic driver sources into basic drivers; and
compiling the script driver sources into a script driver.

52. The method as claimed in claim 51, wherein the step of executing the tests comprises the steps of:
executing the test plans;
launching the script driver by one of the test plans;
calling one of the basic drivers by the script driver; and
calling a PIUT by the basic driver which executes the test on the PIUT.

53. The method as claimed in claim 46, wherein the step of executing the tests further comprises the step of updating the repository.

* * * * *